Oct. 7, 1930.  E. M. REEDY  1,777,628
TOOL FOR CORPORATION STOPS
Filed Dec. 13, 1928

Inventor
Emmett M. Reedy
By Cushman Bryant Darby
Attorneys

Patented Oct. 7, 1930

1,777,628

UNITED STATES PATENT OFFICE

EMMETT M. REEDY, OF DECATUR, ILLINOIS, ASSIGNOR TO MUELLER CO., OF DECATUR, ILLINOIS, A CORPORATION OF ILLINOIS

TOOL FOR CORPORATION STOPS

Application filed December 13, 1928. Serial No. 325,808.

The present invention relates to a tool attachment for corporation stops, and more especially to an improved tool provided with means for preventing injury to the stop when inserting the latter in a main or the like.

A primary object of the invention is to provide a tool with means which closely fits within the bore or nipple of a corporation stop, so as to prevent the outer threaded end of the nipple from being crushed or otherwise injured by the tool when the corporation stop is being attached to a main or service pipe.

A further object of the invention comprehends the provision of a simple, inexpensive and efficient tool attachment for connecting corporation stops into proper engagement with the main.

Other objects and advantages will become apparent from the following description and claim, when taken in conjunction with the accompanying drawings.

Referring to the drawings, in which are shown several preferred embodiments of the invention:

Figure 1:
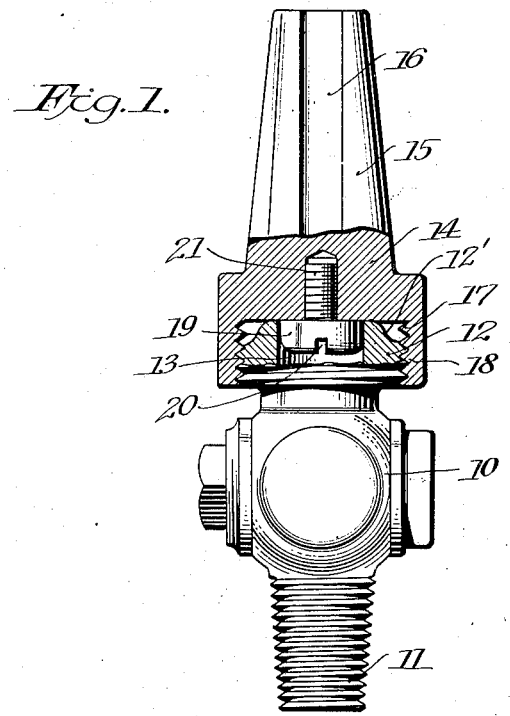
Figure 1 is a side view of a corporation stop partly in section with the invention applied thereto.
Figure 2:
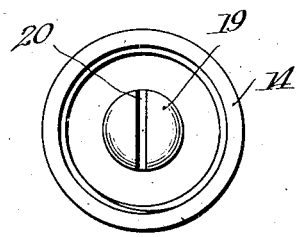
Figure 2 is a bottom plan view of the tool removed from the corporation stop.

Referring to the drawings, in which like numerals indicate like parts in the several views, 10 denotes a corporation stop or cock that may be made of any suitable soft metal, such as copper, lead, or the like, and is provided with an externally threaded tubular portion 11, that is arranged to be inserted in a main or service pipe not shown. The stop 10 also has an externally threaded coupling nipple 12, having a bore 13 which receives a tool 14 in the form of a screw cap for connecting the stop to the main.

The tool 14 is preferably formed with a tapered shank 15 having a lengthwise groove 16 for permitting the connection thereof with a boring bar of a tapping machine or the like. The tool 14 is further formed at one end with a recess 17 of substantially the same diameter as the external diameter of the nipple 12 and has its inner wall threaded as at 18, so as to engage the complementary, external threaded portion of the nipple.

Figure 3:
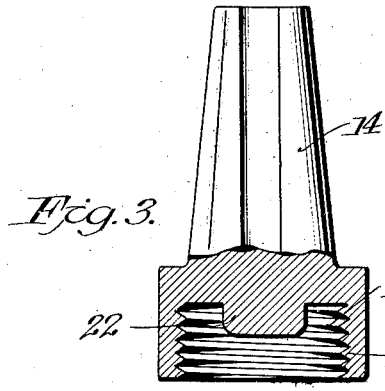
Figure 3 is a detail view partly in section of a modified form of tool.

In order to prevent injury to the outer tapered end 12' of the nipple 12 when the stop is being inserted in a main by the tool 14, a cylindrical supporting member 19 (Fig. 1) is preferably centrally positioned within the recess 17, and is of substantially the same diameter as the bore 13 of the nipple 12 so as to closely fit therein. The member 19 may be in the form of a screw having an enlarged head formed with a tool receiving kerf 20 and a threaded shank 21 that fits in a complementary threaded opening in the tool 14, so as to be readily removable therefrom, or this member may be in the form of an integral projecting circular shoulder or lug 22, which extends axially and medially from the tool a limited distance within the recess 17 (Fig. 3).

It will be seen that the member 19 or the integral lug 22, provide means within the recess 17 for supporting the outer tapered end 12' of the nipple 12, so that the latter will not be deformed or otherwise injured when the stop or cock is being inserted in the main. Were it not for the member 19, the end of the nipple 12 would be crushed against the adjacent abutting wall of the recess 17 when the stop is being attached to the main, thus reducing the area of the bore 13 and destroying the external threads of the nipple 12 to such an extent that it would be necessary to insert a new stop into the main with the consequent expense and delay.

Figure 4:
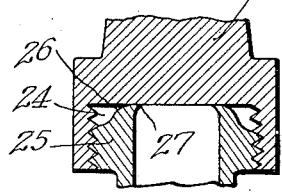
Figure 4 is a detail sectional view showing a coupling connection with my invention removed.

In Figure 4 is shown what is liable to happen when the supporting member 19 is not used when inserting the corporation stop in the main. In this figure, the screw cap 23 is provided at one end with a threaded recess 24 to which is connected the nipple 25 of a copper corporation stop. If the nipple 25 is inserted too far into the recess 24, there will be a tendency for the outer tapered end 26 of the stop to be crushed inwardly, thus reducing the size of the bore, which in turn reduces the volume of flow of the supply, and also forms a burr 27 that acts as an obstruction on which foreign matter will accummulate and gradually result in the complete obstruction or closing of the supply passage.

While the tool is especially adapted for use with corporation stops or cocks of various forms and types, it is quite obvious that it may be readily employed for connecting various other installations where it is essential that none of the threaded parts be injured when being set up. Moreover, it is to be understood that the invention is capable of various modifications, and that such changes may be therein, without departing from the spirit of the invention, as fall within the purview of one skilled in the art and the scope of the appended claim.

I claim:

As an article of manufacture, a tool for connecting corporation stops and the like to a main, which stops have an externally threaded nipple and a substantially undiminished bore therethrough comprising a body having a circular recess in one end, the wall of said recess being interiorly threaded for engagement with a complementary formed portion on the corporation stop and an end wall to engage the annular end of said nipple, and a supporting member extending axially from said tool a limited distance within said recess and fitting said bore sufficiently close to prevent the nipple from being distorted materially to the inside so as to constrict said bore.

In testimony whereof I have hereunto set my hand.

EMMETT M. REEDY.